United States Patent Office 3,746,708
Patented July 17, 1973

3,746,708
N-(MORPHOLINOALKYL) - 2 - INDENECARBOX-
AMIDES AND METHODS OF PREPARING THE
SAME
William Blythe Wright, Jr., Woodcliff Lake, N.J., and
Herbert Joseph Brabander, Nanuet, N.Y., assignors to
American Cyanamid Company, Stamford, Conn.
No Drawing. Continuation-in-part of application Ser. No.
8,091, Feb. 2, 1970. This application Oct. 15, 1971,
Ser. No. 189,736
Int. Cl. C07d 87/42
U.S. Cl. 260—247.2 A          4 Claims

ABSTRACT OF THE DISCLOSURE

The preparation of N-(morpholinoalkyl) derivatives of substituted or unsubstituted 2-indenecarboxamides, is described. The compounds are prepared by several methods, the preferred method being the reaction of a substituted or unsubstituted indenecarboxylic acid with N,N'-carbonyldiimidazole and subsequently with a substituted alkylenediamine. These compounds are useful primarily for their depressant and analgesic activity.

This application is a continuation-in-part of our application Ser. No. 8,091 filed Feb. 2, 1970 now U.S. Patent 3,646,048.

SUMMARY OF THE INVENTION

This invention relates to new compounds. More particularly, it relates to novel N-(morpholinoalkyl) derivatives of 2-indenecarboxamide and methods of preparing the same.

The novel compounds of the present invention may be illustrated by the following formula:

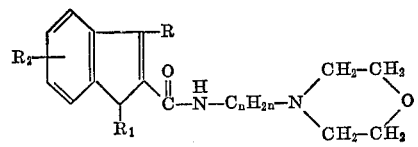

wherein R, $R_1$ and $R_2$ are selected from the group consisting of hydrogen, lower alkyl, lower alkoxy and halogen; $n$ is an integer from 2 to 5; and non-toxic acid addition salts thereof. The term lower alkyl includes those having 1 to 4 carbon atoms and lower alkoxy includes those of 1 to 4 carbon atoms. The term halogen is intended to include chlorine, bromine, and fluorine.

The free bases of the active components of this invention, in general, may be either liquids or solids at room temperature. The free bases, are in general, relatively insoluble in water, but soluble in most organic solvents such as lower alkyl alcohols, benzene, acetone, chloroform, and the like. These compounds form acid addition salts with strong acids, such as hydrochloric acid, sulfuric acid, perchloric acid, and the like. The compounds also form salts with organic acids, as for example, fumaric and maleic acid. Such salts, in general, are soluble in water, methanol and ethanol, but relatively insoluble in benzene, ether, petroleum ether, and the like.

The compounds of this invention can be prepared by one of the following methods of which the first method has been found most advantageous.

FIRST METHOD

A reactive 2-indenecarboxamide is prepared as an intermediate followed by reaction with the alkylene diamine.

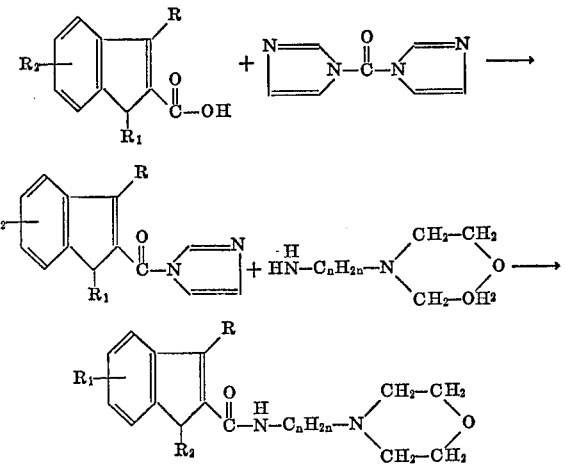

wherein R, $R_1$, $R_2$, and $n$ are as hereinbefore defined. This reaction is best carried out in two steps and tetrahydrofuran is a satisfactory solvent. A temperature range of about 25–75° C. is most desirable for a period of 1 to 36 hours.

SECOND METHOD

The compounds of the present invention can also be prepared by other methods. One of these involves the preparation of a 2-indenecarbonyl chloride as an intermediate followed by reaction with an alkylenediamine:

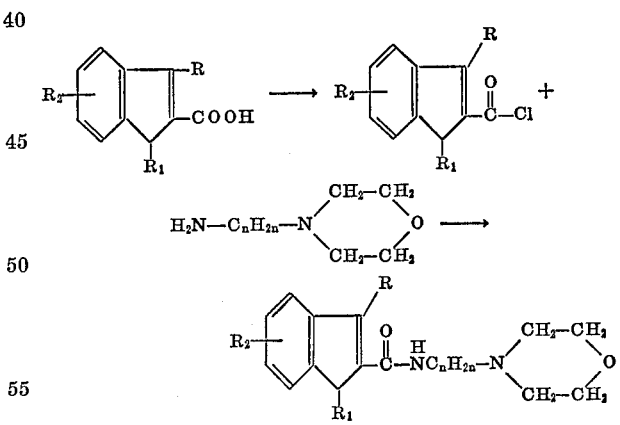

wherein R, $R_1$, $R_2$, and $n$ are as defined hereinbefore.

In this process, the carboxylic acid is reacted with a halogenating agent such as thionyl chloride in an inert solvent. The carboxylic acid chloride is isolated and reacted with an alkylene diamine derivative. The products are removed and purified by recrystallization from a suitable solvent. Alternatively, an ester or acid anhydride may be prepared as the intermediate.

THIRD METHOD

In still another method, the acid and the alkylene diamine are mixed and a carbodiimide derivative is added to effect condensation.

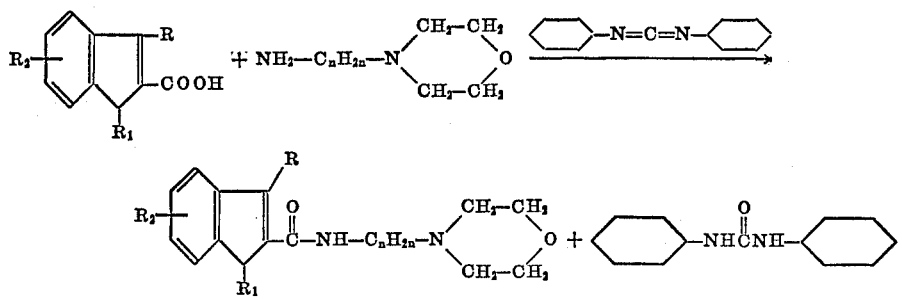

This reaction may usually be carried out within a temperature range of 25–100° C. and the product is isolated by procedures well known to the art.

FOURTH METHOD

A still further method can be used in which 2-indenecarboxamide is used as an intermediate for alkylation procedures as follows:

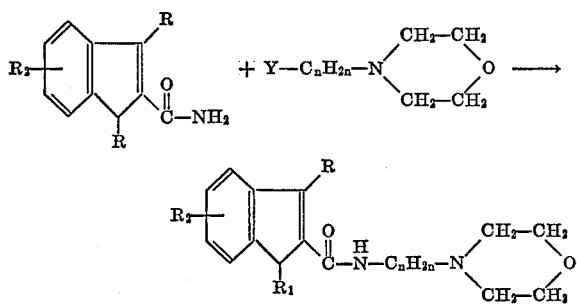

wherein R, $R_1$, $R_2$, and $n$ are as defined hereinbefore and Y is a reactive halogen, lower alkyl sulfonyloxy or arylsulfonyloxy group. The amide is dissolved in an inert solvent, as for example, diethyleneglycol dimethyl ether (diglyme) and reacted with a condensing agent such as sodium hydride and then with an appropriate aminoalkyl derivative. The reaction may be best carried out at temperatures within the range of about 30° C.–200° C. for a period of from 30 minutes to 6 hours.

FIFTH METHOD

Still another method of preparation consists of first preparing the N-(bromoalkyl)-2-indencarboxamide and then reacting this with an amine.

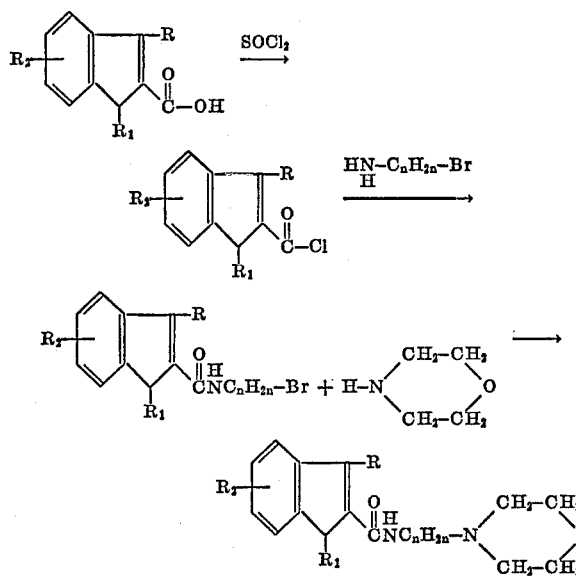

wherein R, $R_1$, $R_2$ and $n$ are as defined hereinbefore. The reaction in the last step takes place when the reagents are contacted in an inert solvent such as ethanol, tetrahydrofuran, toluene, benzene and the like and the reagent mixture is maintained within the temperature of from about 50° to 150° C. for a period of 10 minutes to several hours.

The 2-indenecarboxylic acids used as intermediates are prepared by standard literature procedures: L. Fisnerova et al., Collect. Czech. Chem. Commun. 32 (11), 4082 (1967) (Chemical Abstracts 68 12893K (1968)); D. H. Peacock, Chem., Commun. 1966 (15), 518 (Chemical Abstracts 65 13623C (1966)); R. Graf, Ann. 661, 111 (1963) (Chemical Abstracts 58, 13873C (1963)).

The compounds of the present invention possess central nervous system (CNS) activity at non-toxic doses and, as such, are useful as tranquilizers and CNS depressants. The compounds have been tested pharmacologically and found to have the above properties which show a desirable wide spread between doses producing depressant or sedative actions and toxic symptoms such as paralysis or lethality. They are also antidepressants and analgesics.

A test which indicates tranquilizing activity is represented by a measure of the reduction in motor activity. The compound (50 mg./kg. interperitoneally) is given to a group of 5 mice and a 5 minute count of motor activity is recorded (actophotometer). Counts of $\leq 250$ are considered to indicate a specific reduction (more than two standard deviations) of activity.

Compounds that appeared to reduce motor activity (250 count) are administered to additional groups of 5 mice at graded doses and tested similarly. The motor depressant dose (MDD) which causes a 50% reduction of motor activity (a count of 250) is estimated. The use of reduced motor activity as a measure of tranquilizing activity has been described by W. D. Gray, A. C. Osterberg and C. E. Rauh, Archives Internationales et de Therapie, vol. 134, p. 198 (1961) and by W. J. Kinnard and C. J. Carr, Journal of Pharmacology and Experimental Therapeutics, vol. 121, p. 354 (1957).

Compounds of the present invention are physiologically active in warm-blooded animals as anti-depressants. The anti-depressant properties of the compounds are evident by measuring the ability to counteract in animals a depression induced by the administration of tetrabenazine hexamate. Graded doses of these compounds are administered intraperitoneally to groups of mice. One hour later tetrabenazine hexamate (a well-known agent capable of producing a profound depression) is administered at a dose which is known to depress exploratory behavior in groups of normal mice. Thirty minutes later the anti-depressant treated groups are placed individually at the center of a horizontal disc about 18 inches in diameter. Within a short period of time, these individuals show normal exploratory behavior such as walking to the edge and looking over the side or other characteristic movements related to the normal tendency to explore a new environment. Individuals, treated with tetrabenazine hexamate alone or in a combination with an ineffective anti-depressant agent do not show this normal exploratory behavior, but remain at the center of the disc for a considerable period of time. Compounds of this invention show desirable anti-depressant properties by this procedure at dose levels which are well below the lethal levels, thereby demonstrating a satisfactory therapeutic index of safety.

The compounds of this invention also have been found to be active analgesics. The compounds are tested by a modification of the method described by E. Siegmund et al., Proc. Soc. Expt. Biol. Med., 95, 729 (1957). Briefly, the test is described as follows: Two mice are administered the test compound, orally, 30 minutes prior to the intraperitoneal injection of 1 mg./kg. phenyl-p-quinone (PPQ). Fifteen minutes later the mice are observed for a period of 3 minutes and the total number of characteristic writhing episodes for both animals is counted and recorded. The mean number of writhes exhibited by 21 pairs of control animals (dosed orally with 2% starch) was 29. For our purposes, any compound that reduces the incidence of writhing to 18 or less is considered active in the (PPQ) test, otherwise the compound is rejected. The activity of representative compounds when tested by above procedures is summarized in the following table.

TABLE

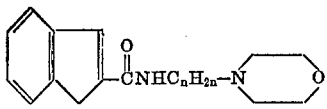

| $n$ | CNS depressant, $MDD_{50}$ [1] | Anti-depressant [2] | Analgesic [3] |
| --- | --- | --- | --- |
| 2 | >50 | R | A |
| 3 | >50 | A | R |
| 4 | 42 | R | A |

[1] Effective dose in mg./kg.; >50=less than 50% reduction of motor activity at 50 mg./kg.
[2] A=active at 6.25 mg./kg.; R=reject at 50 mg./kg.
[3] A=active at 200 mg./kg.; R=rejected at 200 mg./kg.

Compositions containing the 2-indenecarboxamides may be administered to warm-blooded animals orally, or parenterally if desired, and when so administered, may be considered as an agent for therapeutically desirable treatment of mental disorders in daily doses ranging from about 40 to about 1000 milligrams. The dosage regimen can be adjusted to provide optimum therapeutic response. Thus, for example, several smaller doses may be administered daily, or the dose may be reduced proportionately as indicated by the requirements or the particular therapeutic situation.

For therapeutic administration the active compounds of this invention may be incorporated with pharmaceutical carriers such as excipients and used, for example, in the form of tablets, dragees, capsules, suppositories, liquids, elixirs, emulsions, suspensions, syrups, chocolate, candy, wafers, chewing gum, or the like. Such compositions and preparations should contain at least 0.1% active component. The percentage in the compositions and preparations, may, of course, be varied, and may conveniently be between 2% and 60% or more of the weight of the unit. The amount of compound in such therapeutically useful compositions or preparations is such that a suitable dosage will be obtained. Preferred compositions or preparations according to the present invention are prepared so that a dosage unit form contains between about 10 and about 300 milligrams of the active compound. Obviously, in addition to the therapeutic compound, there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

EXAMPLE 1

Preparation of N-(2-morpholinoethyl)-2-indenecarboxamide

A mixture of 4.8 parts of 2-indenecarboxylic acid, 5.2 parts of N,N'-carbonyldiimidazole and 100 parts of dry tetrahydrofuran is allowed to stand at room temperature for one hour and 5.9 parts of 2-morpholinoethylamine are added. After 20 hours, the solvent is distilled off and the residue is stirred with dilute sodium hydroxide and benzene. The benzene layer is separated, washed with water and concentrated. The residue is recrystallized from ethyl acetate. N-(2-morpholinoethyl) - 2 - indenecarboxamide melts at 132–134° C. When this material is mixed with ethanolic hydrogen chloride and ether, the hydrochloride salt, melting point 208–210° C., is obtained.

EXAMPLE 2

Preparation of N-(3-morpholinopropyl)-2-indenecarboxamide

The above compound, melting point 92–94° C. is obtained when 3-morpholinopropylamine is substituted for 2-morpholinoethylamine in the procedure of Example 1. The hydrochloride salt melts at 174–177° C.

EXAMPLE 3

Preparation of N-(4-morpholinobutyl)-2-indenecarboxamide

When 4-morpholinobutylamine is substituted for 2-morpholinoethylamine is the procedure of Example 1, the above compound, melting point 128–130° C., is obtained. The hydrochloride salt melts at 203–205° C.

EXAMPLE 4

Preparation of 1-bromo-3-methyl-N-(2-morpholinoethyl)-2-indenecarboxamide

When 1-bromo-3-methyl-2-indenecarboxylic acid is substituted for 2-indenecarboxylic acid in the procedure of Example 1, the above compound is obtained.

EXAMPLE 5

Preparation of 1-chloro-3-methyl-N-(2-morpholinoethyl)-2-indenecarboxamide

This compound is obtained when 1-chloro-3-methyl-2-indenecarboxylic acid is substituted for 2-indenecarboxylic acid in the procedure of Example 1.

EXAMPLE 6

Preparation of 3-methyl-N-(2-morpholinoethyl)-2-indenecarboxamide

If 3-methyl-2-indenecarboxylic acid is substituted for 2-indenecarboxylic acid in the procedure of Example 1, the above compound is obtained.

EXAMPLE 7

Preparation of 1-methoxy-3-methyl-N-(2-morpholinoethyl)-2-indenecarboxamide

This compound is obtained when 1-methoxy-3-methyl-2-indenecarboxylic acid is substituted for 2-indenecarboxylic acid in the procedure of Example 1.

EXAMPLE 8

Preparation of 7-bromo-N-(2-morpholinoethyl)-2-indenecarboxamide

The above compound is obtained when 7-bromo-2-indenecarboxylic acid is substituted for 2-indenecarboxylic acid in the procedure of Example 1.

EXAMPLE 9

Preparation of 4-methyl-N-(2-morpholinoethyl)-2-indenecarboxamide

When 4-methyl-2-indenecarboxylic acid is substituted for 2-indenecarboxylic acid in the procedure of Example 1, the above compound is obtained.

EXAMPLE 10

Preparation of 1-methyl-N-(2-morpholinoethyl)-2-indenecarboxamide

This compound is obtained when 1-methyl-2-indenecarboxylic acid is substituted for 2-indenecarboxylic acid in the procedure of Example 1.

EXAMPLE 11

Preparation of 5-fluoro-N-(2-morpholinoethyl)-2-indenecarboxamide

This compound is obtained when 5-fluoro-2-indenecarboxylic acid is substituted for 2-indenecarboxylic acid in the procedure of Example 1.

EXAMPLE 12

Preparation of N-(5-morpholinopentyl)-2-indenecarboxamide

If 5-morpholinopentylamine is substituted for 2-morpholinoethylamine in the procedure of Example 1, the above compound is obtained.

EXAMPLE 13

Preparation of 7-chloro-N-(2-morpholinoethyl)-2-indenecarboxamide

The above compound is obtained when 7-chloro-2-indenecarboxylic acid is substituted for 2-indenecarboxylic acid in the procedure of Example 1.

What is claimed is:

1. An indenecarboxamide of the formula:

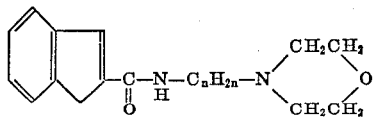

wherein $n$ is an integer from 2 to 5, and non-toxic acid addition salts thereof.

2. The indenecarboxamide according to claim 1, N-(4-morpholinobutyl)-2-indenecarboxamide.
3. The indenecarboxamide according to claim 1, N-(3-morpholinopropyl)-2-indenecarboxamide.
4. The indenecarboxamide according to claim 1, N-(2-morpholinoethyl)-2-indenecarboxamide.

No references cited.

ALEX MAZEL, Primary Examiner

J. TOVAR, Assistant Examiner

U.S. Cl. X.R.

424—248